No. 859,253. PATENTED JULY 9, 1907.
C. RESTEIN.
PACKING.
APPLICATION FILED APR. 10, 1907.
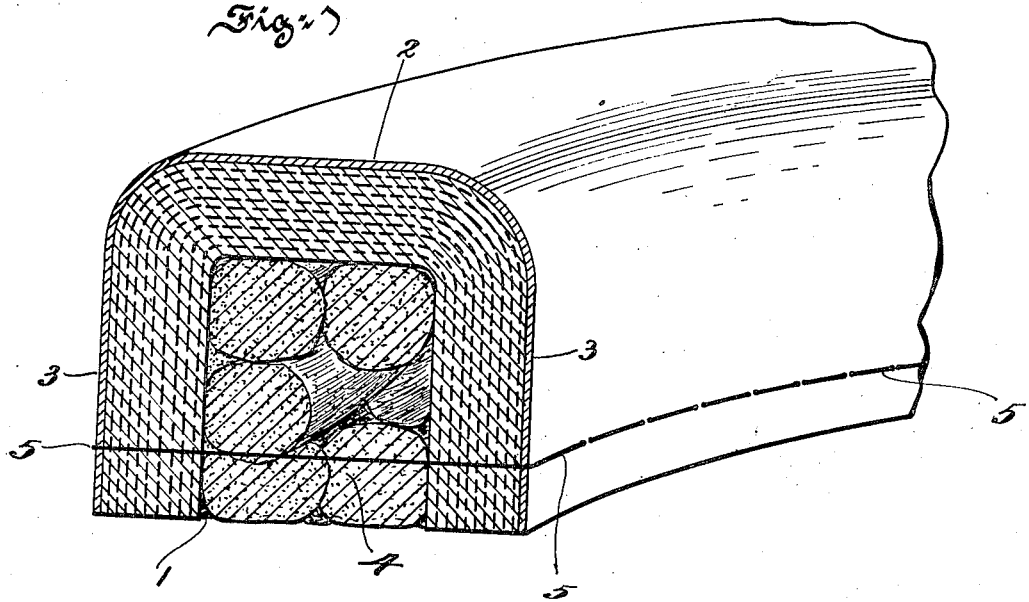
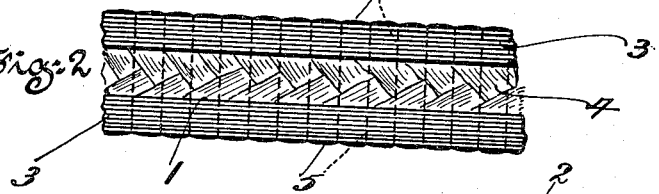
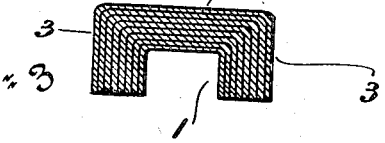
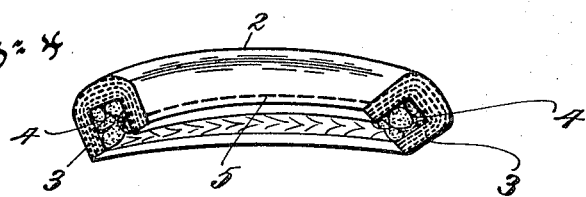
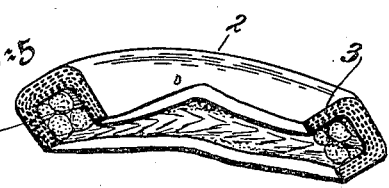
Witnesses:
Inventor:
Clement Restein.

UNITED STATES PATENT OFFICE.

CLEMENT RESTEIN, OF PHILADELPHIA, PENNSYLVANIA.

PACKING.

No. 859,253.

Specification of Letters Patent.

Patented July 9, 1907.

Application filed April 10, 1907. Serial No. 367,327.

*To all whom it may concern:*

Be it known that I, CLEMENT RESTEIN, a citizen of the United States, residing at Philadelphia, in the county of Philadelphia and State of Pennsylvania, have invented a certain new and useful Packing, of which the following is a specification.

Objects of the present invention are to provide a packing which shall be efficient and durable for packing, for example, pumps, to provide against accidental detachment of the layers of duck by reason of the wear and movement of the piston rod, and to hold the parts of the packing in proper position when it is bent in ring form whereby it can be adjusted and held up to its work throughout a comparatively great length of time without distortion or undue wear.

The nature, characteristic features and scope of my invention will be more fully understood from the following description taken in connection with the accompanying drawings forming part hereof and in which Figure 1, is a view, partly in section and partly in perspective, of a packing embodying features of the invention. Fig. 2, is a view of the under side of the packing as arranged in Fig. 1. Fig. 3, is a detail sectional view of a part of the packing. Fig. 4, is a view of the packing bent into ring form, and Fig. 5, is a view illustrating a result or distortion avoided by the present invention.

The packing consists of two parts, a channeled or grooved part 1, that comprises a back 2, and projections 3, and a part 4, fitted into the channel or groove of the part 2. The part 1, consists of superposed layers each of which extends continuously across the back 2, and around the projections 3. These layers may be of duck and rubber or the like. Since these layers extend in the manner described it is evident that they are not likely to be pulled away or detached by the motion of the piston rod. The part 4, may consist of a braid or plait of fibrous material of which hemp, jute and flax are examples. 5, is a line of stitching or a row of stitches which extend across the projections 3, and through the part 4. Incidentally they operate to keep the parts together but their real purpose is to prevent the projections 3, from bulging when the packing is brought into ring form. Fig. 4, shows that the stitches accomplish this result, and Fig. 5, shows the bulging that is prevented by the stitches. The fact that the extensions or lips 3, do not bulge obviously insures the presentation and retention of the packing in proper position in respect to the piston.

What I claim as new and desire to secure by Letters Patent is:

1. A packing consisting of a grooved or channeled member and a second member arranged in the groove of the first member, and stitches extending through both members of the packing and arranged along the open edge thereof, substantially as described.

2. A packing comprising a grooved member consisting of superposed layers each extending across its back and along its projections or lips, a second member arranged in the groove of the first member, and a line of stitches binding the lips or extensions together at their edges for preventing distortion of the packing when arranged in ring form, substantially as described.

3. A packing comprising two members of which one is channeled or grooved and consists of co-extensive superposed layers of duck and cement and of which the other is arranged in the channeled or grooved portion of the first, substantially as described.

4. A packing comprising a grooved member having a packing and lips and consisting of layers of cement and textile each of the latter extending across the back and along the lips, and fibrous plait arranged in the groove of said member, and stitches penetrating said lips and plait near their edges, substantially as described.

5. A packing comprising a channeled member consisting of superposed layers of duck and rubber each extending across its back and throughout its lips, and a textile plait arranged in the groove of said member, and a marginal row of stitches for preventing the lips from bulging, substantially as described.

In testimony whereof I have hereunto signed my name.

CLEMENT RESTEIN.

Witnesses:
WM. J. JACKSON,
FRANK E. FRENCH.